United States Patent
Igarashi et al.

(10) Patent No.: US 7,565,120 B2
(45) Date of Patent: Jul. 21, 2009

(54) SEMICONDUCTOR INTEGRATED CIRCUIT AND SEMICONDUCTOR INTEGRATED CIRCUIT FOR RADIO COMMUNICATION

(75) Inventors: Yutaka Igarashi, Yokohama (JP); Yusaku Katsube, Yokohama (JP); Akio Yamamoto, Hiratsuka (JP)

(73) Assignee: Renesas Technology Corp., Tokyo (JP)

( * ) Notice: Subject to any disclaimer, the term of this patent is extended or adjusted under 35 U.S.C. 154(b) by 493 days.

(21) Appl. No.: 11/585,996

(22) Filed: Oct. 25, 2006

(65) Prior Publication Data

US 2007/0190961 A1      Aug. 16, 2007

(30) Foreign Application Priority Data

Feb. 13, 2006    (JP) .............................. 2006-035671

(51) Int. Cl.
*H04B 1/06* (2006.01)
(52) U.S. Cl. .................. 455/130; 455/296; 455/324
(58) Field of Classification Search ................. 455/130, 455/131, 132, 232, 255, 256, 295, 296, 302, 455/303, 304, 318, 323, 324
See application file for complete search history.

(56) References Cited

U.S. PATENT DOCUMENTS

2004/0077327 A1*   4/2004   Lim et al. .................... 455/318

2006/0293018 A1*   12/2006   Reynolds .................... 455/324

OTHER PUBLICATIONS

"3rd Generation Partnership Project; Technical Specification Group Radio Access Network; User Equipment (UE) radio transmission and reception (FDD) (Release 6)," 3GPP TS 25.101 V6.5.0 (Sep. 2004), Technical Specification.

* cited by examiner

*Primary Examiner*—Thanh C Le
(74) *Attorney, Agent, or Firm*—McDermott Will & Emery LLP (57) ABSTRACT

In a signal receiving circuit of a direct conversion system applied with a semiconductor integrated circuit for radio communication having a PLL requiring a clock signal, an LNA requiring low-noise receiving characteristics, and others, a variable coupling line is provided between clock signal buffers and at an input stage of the PLL, so that coupling between the variable coupling line and an input terminal of the LNA and coupling between the variable coupling line and a GND terminal of the LNA are made equal to each other at frequencies of higher harmonic waves of a clock signal. When the input terminal and the GND terminal of the LNA are excited at the same phase, since no output occurs at an output terminal of the LNA, an output of the LNA does not contain any higher harmonic wave of a clock signal.

5 Claims, 5 Drawing Sheets

SEMICONDUCTOR INTEGRATED CIRCUIT AND SEMICONDUCTOR INTEGRATED CIRCUIT FOR RADIO COMMUNICATION

CROSS-REFERENCE TO RELATED APPLICATION

The present application claims priority from Japanese Patent Application No. JP 2006-035671 filed on Feb. 13, 2006, the content of which is hereby incorporated by reference into this application.

TECHNICAL FIELD OF THE INVENTION

The present invention relates to a technology for a semiconductor integrated circuit. More particularly, it relates to a technology effectively applied to a semiconductor integrated circuit for radio communication in which a circuit block requiring a clock signal and a circuit block requiring low-noise receiving characteristics are disposed in one chip.

BACKGROUND OF THE INVENTION

In a conventional semiconductor integrated circuit for radio communication, each radio signal processing circuit is composed of a discrete component for each function block (such as an amplifier for signal amplification, a mixer for signal frequency conversion, a filter for passing only a signal of a desired bandwidth). However, with the recent improvements in semiconductor technology, a plurality of functional blocks configuring a radio signal processing circuit have been able to be incorporated in one semiconductor chip. A radio signal processing circuit with its components incorporated in one or more semiconductor chips converts a radio-frequency signal received from an antenna to a signal of a lower frequency band with high quality (with less noise or suppressing signals in bands other than a desired band).

To achieve a radio signal processing circuit at low cost, more functional blocks configuring the radio signal processing circuit have to be incorporated in one semiconductor chip. As one example of the radio signal processing circuit, a block diagram of a receiving circuit adopting a direct conversion system that has been examined as a background of the invention by the inventors of the present invention is shown in FIG. 4.

Figure 4:
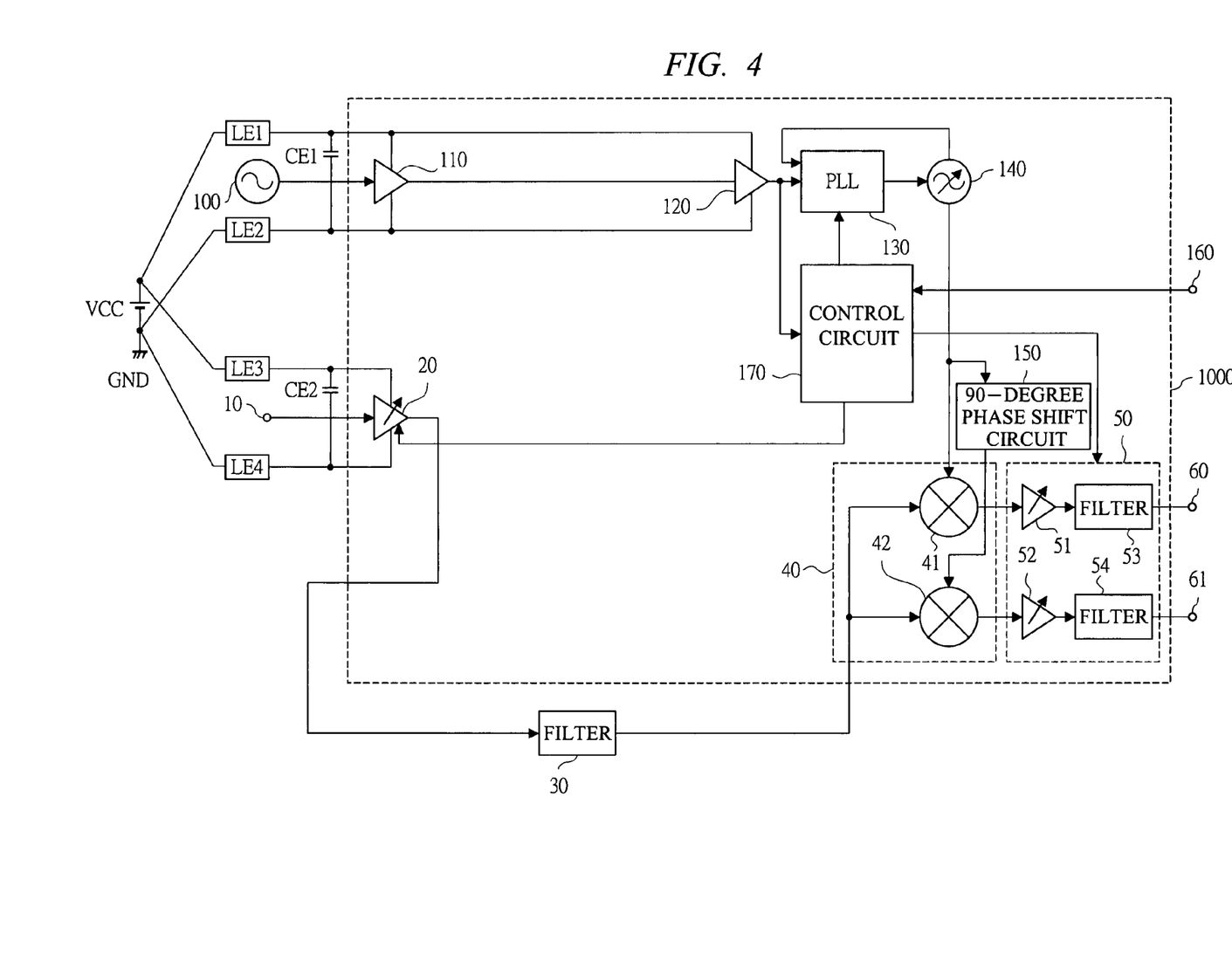
FIG. 4 is a block diagram showing a signal receiving circuit of a direct conversion system that has been examined as background of the present invention.

In FIG. 4, reference numeral 10 denotes a low noise amplifier (hereinafter, referred to as LNA) input terminal, 20 denotes an LNA, 30 denotes a filter, 40 denotes an orthogonal mixer, 41 and 42 denote mixers, 50 denotes a low frequency signal processing unit, 51 and 52 denote variable gain amplifiers, 53 and 54 denote filters, 60 and 61 denote output terminals, 100 denotes a clock signal oscillator, 110 and 120 denote clock signal buffers, 130 denotes a phase locked loop (hereinafter, referred to as PLL), 140 denotes a voltage controlled oscillator (hereinafter, referred to as VCO), 150 denotes a 90-degree phase shift circuit, 160 denotes a control signal input terminal, 170 denotes a control circuit, 1000 denotes a semiconductor chip, VCC denotes a power source, GND denotes a ground, CE1 and CE2 denote capacitors, and LE1 to LE4 denote transmission lines.

A radio signal inputted from an antenna (not shown) is inputted to the LNA input terminal 10. The LNA 20 amplifies the radio signal at low noise and low distortion characteristics to output the same. When the LNA 20 is set to have as high gain as possible within a range where distortion characteristics in a whole system of a receiving circuit can be satisfied, it is advantageous for low noise characteristics in the system of the receiving circuit. An output signal from the LNA 20 is inputted into the filter 30. An output from the filter 30 is inputted into the semiconductor chip 1000 again.

To achieve a radio signal processing circuit at low cost, more functional blocks configuring the radio signal processing circuit have to be incorporated in one semiconductor chip. In general, a surface acoustic wave (hereinafter referred to as SAW) filter, a dielectric filter or the like is used as the filter 30. Though signals in bands other than a desired band are suppressed by the filter 30, the SAW filter and the dielectric filter cannot be incorporated in a semiconductor chip. Accordingly, the filter 30 is disposed outside the semiconductor chip 1000.

A clock signal generated from the clock signal generator 100 is inputted into the semiconductor chip 1000 and it is amplified by the clock signal buffers 110 and 120 and then supplied to the PLL 130 and the control circuit 170. The control circuit 170 performs gain switching among the LNA 20 and the variable gain amplifiers 51 and 52 and setting of a frequency dividing ratio in the PLL 130 according to a control signal inputted from the control signal input terminal 160.

The gain switching in the LNA 20 to a lower gain occurs when a signal level of a radio signal inputted from the antenna (not shown) into the LNA input terminal 10 is high enough to deteriorate the distortion characteristics in the system of the signal receiving circuit positioned at a downstream side of the filter 30. On the contrary, the gain switching in the LNA 20 to a higher gain occurs when a signal level of a radio signal inputted from the antenna (not shown) into the LNA input terminal 10 is not high enough to influence the distortion characteristics in the system of the signal receiving circuit positioned at a downstream side of the filter 30. In this manner, the noise characteristics and the distortion characteristics in the system of the receiving circuit become optimal.

The gain switching in the variable gain amplifiers 51 and 52 is performed so that levels of signals outputted from the output terminals 60 and 61 fall in a signal level range set by a demodulating circuit (not shown) disposed at downstream sides of the output terminals 60 and 61.

The PLL 130 compares a frequency of a signal obtained by dividing an oscillation frequency of the VCO 140 by a frequency dividing ratio set according to a control signal from the control circuit 170 and a frequency of a signal obtained by dividing a frequency of a clock signal from the clock signal buffer 120 by a frequency dividing ratio set according to a control signal from the control circuit 170 with each other and performs the control so that a difference therebetween becomes a desired level or less. By this means, an output voltage which determines the oscillation frequency of the VCO 140 is outputted to the VCO 140.

For example, when the clock signal frequency from the clock signal buffer 120 is represented as fR, the frequency dividing ratio set according to a control signal from the control circuit 170 for the clock signal frequency from the clock signal buffer 120 is represented as R, and the frequency dividing ratio set according to a control signal from the control circuit 170 for the oscillation frequency from the VCO 140 is represented as N, an oscillation frequency fVCO of the VCO 140 is expressed by the following equation.

$$fVCO = fR \times N/R$$

By this means, the VCO 140 is controlled to oscillate at different frequencies according to respective receiving channels. Since the signal receiving circuit shown in FIG. 4 is of the direct conversion system, the center frequency of a receiving channel and a frequency of an oscillation signal provided to the mixers 41 and 42 are controlled to be equal to each other.

The oscillation signals from the VCO 140 are inputted to the mixer 41 and the mixer 42. In this case, the oscillation signal inputted into the mixer 41 has the same phase as the original oscillation signal and the oscillation signal inputted into the mixer 42 is converted by the 90-degree phase shift circuit 150 so as to have a phase different from that of the signal inputted into the mixer 41 by 90 degrees. An output signal from the mixer 41 is amplified to a desired level by the variable gain amplifier 51, and after signal components of the amplified output signal in bands other than a desired channel band are suppressed by the filter 53, the signal is outputted from the output terminal 60. An output signal from the mixer 42 is amplified to a desired level by the variable gain amplifier 52, and after signal components in the amplified output signal in bands other than a desired channel band are suppressed by the filter 54, the signal is outputted from the output terminal 61.

The mixers 41 and 42 are collectively called "orthogonal mixer" and they are shown as an orthogonal mixer 40 in FIG. 4. The variable gain amplifiers 51 and 52 and the filters 53 and 54 perform processing of a low frequency signal in a desired channel band obtained by the frequency conversion by the orthogonal mixer 40 and they are shown as a low frequency signal processing unit 50 in FIG. 4.

The power source VCC is a power source which supplies power to the semiconductor chip 1000. The power is inputted into the semiconductor chip 1000 via the transmission lines LE1 to LE4. The capacitor CE2 is inserted between the LNA 20 and the power source and the capacitor CE1 is inserted between the clock signal buffers 110 and 120 and the power source, so that characteristic degradation and malfunction due to noise or the like can be suppressed by short-circuiting the impedance of the power source VCC which rises due to the influence of the transmission lines LE1 to LE4 in an AC manner.

SUMMARY OF THE INVENTION

Incidentally, in the receiving circuit of the direct conversion system shown in FIG. 4, the LNA 20 required to achieve the low noise operation and the PLL 130 requiring a clock signal are disposed in a mixed manner on one small semiconductor chip.

It is assumed that the clock signal is a rectangular wave with a frequency of f [Hz], the maximum amplitude of A [V], the maximum amplitude period of 1/(2f) [sec], the minimum amplitude 0 [V], and the minimum amplitude period of 1/(2f) [sec]. The rectangular wave can be expressed by infinite series as a function f(t) of a time t as follows.

$$f(t) = \frac{A}{2} + \frac{2}{\pi}\left(\sin 2\pi ft + \frac{1}{3}\sin 6\pi ft + \frac{1}{5}\sin 10\pi ft + ...\right) \quad \text{[Equation 1]}$$

This equation indicates that the clock signal can be expressed by a sum signal of signals having frequency components of odd-number times the frequency f of the clock signal. That is, when a frequency band of a receive signal to be processed in the radio signal processing circuit falls in a frequency band of the odd-number times the frequency of the clock signal, higher harmonic waves multiplied by the odd-number times enter an input line of the LNA, which degrades the receiving characteristics. In fact, since the waveform of the clock signal is not the ideal rectangular waveform, not only the higher harmonic waves multiplied by the odd-number times but also higher harmonic waves multiplied by even-number times are present, and these higher harmonic waves enter the input line of the LNA, which degrades the receiving characteristics.

Figure 5:
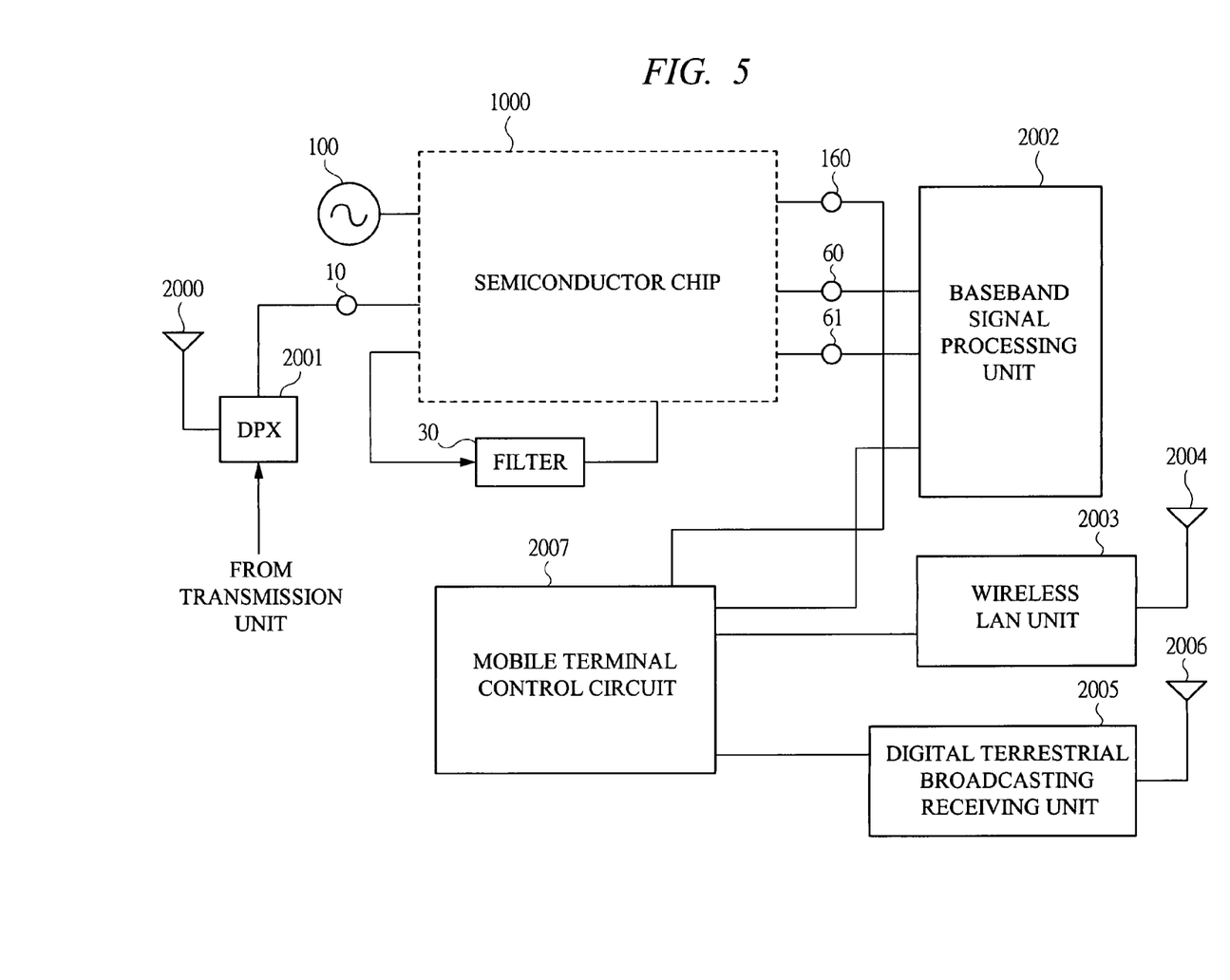
FIG. 5 is a block diagram showing a mobile terminal using the signal receiving circuit of a direct conversion system that has been examined as background of the present invention.

Recently, a wireless LAN function and a digital terrestrial broadcasting receiving function have been gradually incorporated in more mobile terminals such as a cellular phone using a receiving circuit with a direct conversion system. FIG. 5 is a block diagram showing a mobile terminal in which the receiving circuit of the direct conversion system shown in FIG. 4 is used and the wireless LAN function and the digital terrestrial broadcasting receiving function are incorporated. The semiconductor chip 1000, terminals 10, 60, 61, 160, and the like are the same as those shown in FIG. 4. In FIG. 5, reference numeral 2000 denotes an antenna for a main radio communication function of the mobile terminal, 2001 denotes a DPX (branching filter) which feeds a signal from a transmitting unit (not shown) in the mobile terminal to the antenna and feeds a signal from the antenna to an LNA in the semiconductor chip, 2002 denotes a baseband signal processing unit for processing a signal obtained from an output terminal of the semiconductor chip 1000, 2003 denotes a wireless LAN unit for realizing a wireless LAN function, 2004 denotes an antenna for the wireless LAN, 2005 denotes a digital terrestrial broadcasting receiving unit for realizing a digital terrestrial broadcasting receiving function, 2006 denotes an antenna for digital terrestrial broadcasting receiving function, and 2007 denotes a mobile terminal control unit for controlling respective units.

When a plurality of wireless functions are incorporated on the mobile terminal as shown in the configuration in FIG. 5, the higher harmonic waves enter the LNA not only from the above-described clock signal but also from the wireless LAN unit and the digital terrestrial broadcasting receiving unit, and influence of the entrance becomes complicated particularly when the mobile terminal is assembled as a product.

The case where a clock signal enters an LNA will be explained below. For example, it is assumed that a clock signal is supplied as a rectangular wave of 26 MHz and 0 dBm. It is assumed that isolation between a clock signal input terminal to the semiconductor chip 1000 and an input terminal into the LNA 20 is 50 dB. When a receiving band in the LNA is Band 1 (2110 to 2170 MHz) in WCDMA, a higher harmonic wave of 83 times 26 MHz, namely, 26×83=2158 MHz enters the receiving band.

Since the 83-times higher harmonic wave becomes 1/83 of a basic wave level according to the above Equation 1, [clock level of clock signal input terminal to semiconductor chip 1000]-20×log(83)-[isolation between clock signal input terminal to semiconductor chip 1000 and input terminal to LNA 20]=0-20×log(83)-50=-88.4 dBm is obtained. Since it is established in Standards in WCDMA (see 3GPP TS 25.101 (Non-Patent Literature 1)) that a signal smaller than -100 dBm has to be received, practical application cannot be achieved as far as higher harmonic waves of clock signal up to -88.4 dBm are present.

Since expansion of the isolation between the clock signal input terminal to the semiconductor chip 1000 and the input terminal to the LNA 20 is equivalent to enlargement of the semiconductor chip or the package size, it is not desirable because not only a mounting area but also a manufacturing cost is increased.

A proposal that the LNA 20 is disposed on a chip other than the semiconductor chip 1000 increases not only the mounting area but also the manufacturing cost. A proposal that the LNA 20 is configured to be of a differential type so as to cancel higher harmonic waves of clock signal causes increase in the number of pins and increase in consumption current, which is not desirable.

In view of these circumstances, an object of the present invention is to provide a technology for a semiconductor integrated circuit capable of securing desired signal receiving characteristics even if a circuit block requiring a clock signal and a circuit block requiring low-noise receiving characteristics are disposed in one chip so as to solve the problems described above.

The above and other objects and novel characteristics of the present invention will be apparent from the description of this specification and the accompanying drawings.

The typical ones of the inventions disclosed in this application will be briefly described as follows.

The present invention is applied to a semiconductor integrated circuit, and the semiconductor integrated circuit comprises: a first circuit where N sets of a switch and a capacitor connected in series are inserted in parallel between a power source voltage line and a ground line; a second circuit where N sets of a switch and a capacitor connected in series are inserted in parallel between a signal line and the ground line or the power source voltage line; and a 2N-bit register which arbitrarily turns ON or OFF the N switches in the first circuit and the N switches in the second circuit.

Also, the present invention can be applied to a semiconductor integrated circuit for radio communication, and the semiconductor integrated circuit for radio communication comprises: an LNA which amplifies a signal from an input terminal to output the same; a VCO which changes an oscillation frequency according a voltage value of an input voltage; a control circuit which feeds a control signal from a control signal input terminal to the VCO and the LNA; a PLL which receives the control signal from the control circuit and compares an output from a clock signal oscillator and an oscillation frequency of the VCO with each other to perform control so that the oscillation frequency of the VCO becomes a function of the control signal and a clock signal frequency; a 90-degree phase shift circuit which shifts a phase of an oscillation signal of the VCO by 90 degrees; and a mixer circuit which multiplies an output signal from the 90-degree phase shift circuit or the oscillation signal of the VCO and an output signal from a filter by each other to output a sum frequency component of an output signal frequency of the 90-degree phase shift circuit or an oscillation signal frequency of the VCO and an output signal frequency of the filter or a difference frequency component therebetween, wherein a variable coupling line which can change a coupling degree of an input terminal of the LNA to a ground terminal of the LNA is provided at an input stage of the PLL. By this means, even if a circuit block requiring a clock signal and a circuit block requiring low-noise receiving characteristics are disposed in one chip, desired signal receiving characteristics can be secured.

More specifically, the semiconductor integrated circuit for radio communication according to the present invention comprises: an LNA which amplifies a signal from an input terminal at low noise and low distortion characteristic and with a desired gain and outputs the amplified signal; a VCO which changes an oscillation frequency according a voltage value of an input voltage; a first variable gain amplifier which amplifies an input signal with a desired gain and outputs the same; a second variable gain amplifier which is equal to the first variable gain amplifier; a control signal input terminal to which a first control signal for setting an oscillation frequency of the VCO, a second control signal for setting a gain value of the LNA, and a third control signal for setting gain values of the first and second variable gain amplifiers are inputted; a control circuit which feeds the first, second, and third control signals from the control signal input terminal to the VCO, the LNA, and the first and second variable gain amplifiers, respectively; a first clock signal buffer which amplifies an output from a clock signal oscillator; a second clock signal buffer which amplifies an output from the first clock signal buffer; a PLL which receives a first control signal from the control circuit and compares an output from the second clock signal buffer and an oscillation frequency of the VCO with each other to perform control so that the oscillation frequency of the VCO becomes a function of the first control signal and a clock signal frequency; a first mixer which multiplies an oscillation signal of the VCO and an output signal from the filter by each other and outputs a sum frequency component of an oscillation signal frequency of the VCO and an output signal frequency of the filter or a difference frequency component therebetween; a 90-degree phase shift circuit which shifts a phase of an oscillation signal of the VCO by 90 degrees; a second mixer which multiplies an output signal from the 90-degree phase shift circuit and an output signal from the filter by each other and outputs a sum frequency component of an output signal frequency of the 90-degree phase shift circuit and an output signal frequency of the filter or a difference frequency component therebetween; a first filter which suppresses a signal component present in bands other than a desired band from a signal obtained by amplifying an output from the first mixer to a desired gain in the first variable gain amplifier and then outputted from the first variable gain amplifier; and a second filter which suppresses a signal component present in bands other than a desired band from a signal obtained by amplifying an output from the second mixer to a desired gain in the second variable gain amplifier and then outputted from the second variable gain amplifier, wherein a variable coupling line which can change a coupling degree of an input terminal of the LNA to a ground terminal of the LNA is provided between the first clock signal buffer and the second clock signal buffer.

Furthermore, in the semiconductor integrated circuit for radio communication according to the present invention, the variable coupling line comprises: a first circuit where N sets of a switch and a capacitor connected in series are inserted in parallel between a power source voltage line and a ground line; a second circuit where N sets of a switch and a capacitor connected in series are inserted in parallel between a signal line and the ground line or the power source voltage line; and a 2N-bit register which arbitrarily turns ON or OFF the N switches in the first circuit and the N switches in the second circuit.

The effects obtained by typical aspects of the present invention will be briefly described below.

According to the present invention, even if a circuit block requiring a clock signal and a circuit block requiring low-noise receiving characteristics are disposed in one chip, desired signal receiving characteristics can be secured.

DESCRIPTIONS OF THE PREFERRED EMBODIMENTS

Hereinafter, embodiments of the present invention will be described in detail.

Figure 1:
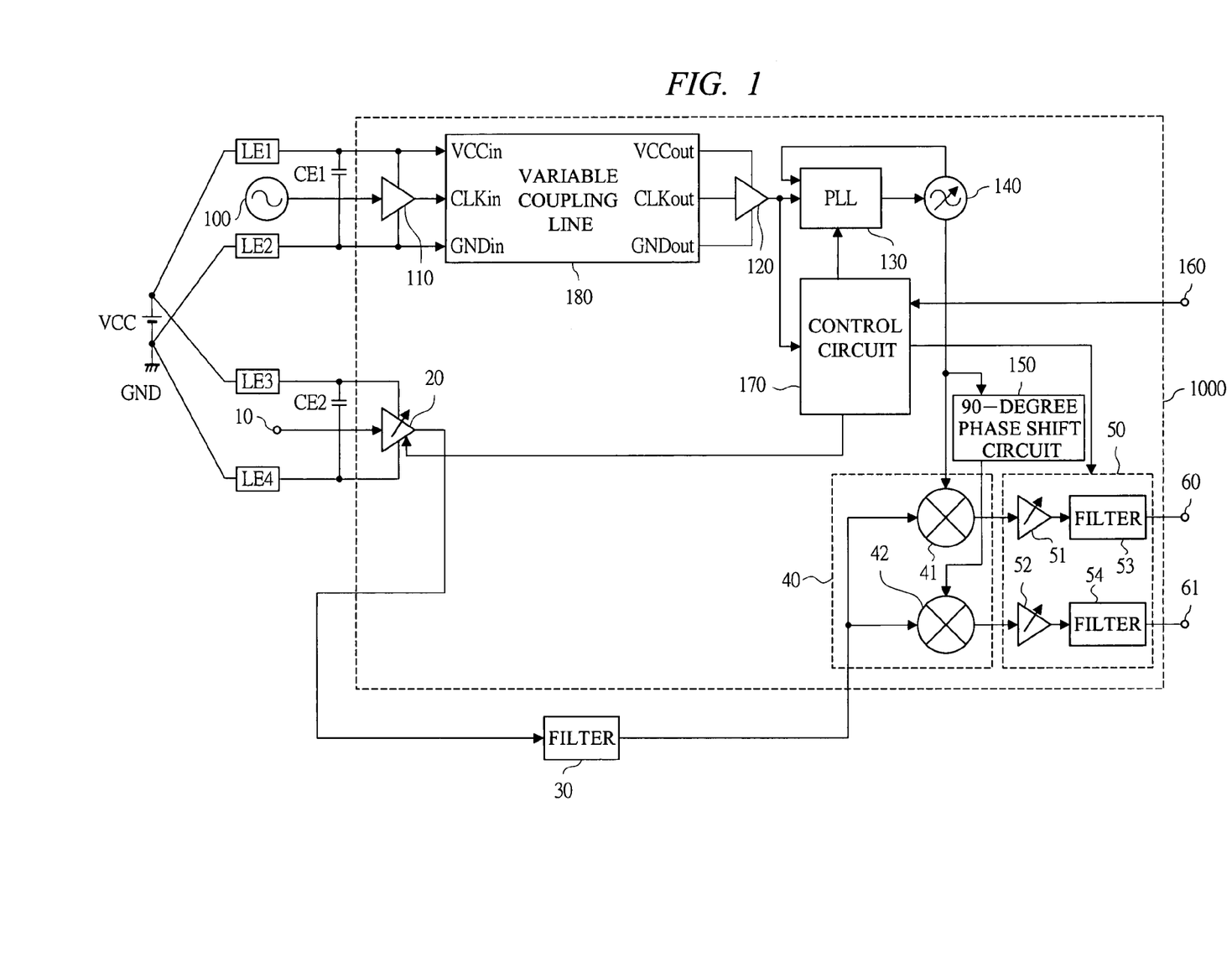
FIG. 1 is a block diagram showing a signal receiving circuit of a direct conversion type according to an embodiment to which a semiconductor integrated circuit for radio communication of the present invention has been applied.

FIG. 1 is a block diagram showing a signal receiving circuit of a direct conversion system according to an embodiment to which a semiconductor integrated circuit for radio communication of the present invention has been applied.

In FIG. 1, reference numeral 10 denotes an LNA input terminal, 20 denotes an LNA, 30 denotes a filter, 40 denotes an orthogonal filter, 41 and 42 denote mixers, 50 denotes a low frequency signal processing unit, 51 and 52 denote variable gain amplifiers, 53 and 54 denote filters, 60 and 61 denote output terminals, 100 denotes a clock signal oscillator, 110 and 120 denote clock signal buffers, 130 denotes a PLL, 140 denotes a VCO, 150 denotes a 90-degree phase shift circuit, 160 denotes a control signal input terminal, 170 denotes a control circuit, 180 denotes a variable coupling line, 1000 denotes a semiconductor chip, VCC denotes a power source, GND denotes a ground, CE1 and CE2 denote capacitors, LE1 to LE4 denote transmission lines.

The signal receiving circuit of a direct conversion system according to this embodiment comprises the LNA 20, the VCO 140, the first variable gain amplifier 51, the second variable gain amplifier 52, the control signal input terminal 160, the control circuit 170, the first clock signal buffer 110, the second clock signal buffer 120, the PLL 130, the first mixer 41, the 90-degree phase shift circuit 150, the second mixer 42, the first filter 53, the second filter 54, the variable coupling line 180, and the like, and these function blocks are disposed in one semiconductor chip 1000. These function blocks include functions described below.

The LNA 20 amplifies a signal from the LNA input terminal 10 at low noise and low distortion characteristic and with a desired gain and then outputs the amplified signal. The VCO 140 changes an oscillation frequency according to a voltage value of an input voltage from the PLL 130.

The variable gain amplifier 51 amplifies an input signal from the mixer 41 with a more desirable gain and then outputs the amplified signal. The variable gain amplifier 52 amplifies an input signal from the mixer 42 with a more desirable gain and then outputs the amplified signal like the variable gain amplifier 51.

A first control signal for setting an oscillation frequency of the VCO 140, a second control signal for setting a gain value of the LNA 20, and a third control signal for setting gain values of the variable gain amplifiers 51 and 52 are inputted to the control signal input terminal 160.

The control circuit 170 sends the first, second, and third control signals from the control signal input terminal 160 to the VCO 140, the LNA 20, and the variable gain amplifiers 51 and 52, respectively.

The clock signal buffer 110 amplifies an output from the clock signal oscillator 100. The clock signal buffer 120 amplifies an output from the clock signal buffer 110.

The PLL 130 receives the first control signal from the control circuit 170 and compares an output from the clock signal buffer 120 and an oscillation frequency of the VCO 140 to perform the control so that the oscillation frequency of the VCO becomes a function of the first control signal and the clock signal frequency. The 90-degree phase shift circuit 150 shifts a phase of an oscillation signal from the VCO 140 by 90 degrees.

The mixer 41 multiplies an oscillation signal from the VCO 140 and an output signal from the filter 30 by each other and outputs a sum frequency component or a difference frequency component between the oscillation signal frequency of the VCO 140 and the output signal frequency of the filter 30. The mixer 42 multiplies an output signal from the 90-degree phase shift circuit 150 and the output signal from the filter 30 by each other and outputs a sum frequency component or a difference frequency component between the output signal frequency of the 90-degree phase shift circuit 150 and the output signal frequency of the filter 30.

The filter 53 suppresses signal components present in bands other than a desired band from the signal obtained by amplifying an output signal from the mixer 41 to a desired gain in the variable gain amplifier 51 and then outputted from the variable gain amplifier 51. The filter 54 suppresses signal components present in bands other than a desired band from the signal obtained by amplifying an output signal from the mixer 42 to a desired gain in the variable gain amplifier 52 and outputted from the variable gain amplifier 52.

The variable coupling line 180 is disposed between the clock signal buffer 110 and the clock signal buffer 120 to vary a coupling degree to an input terminal of the LNA 20 and a ground terminal of the LNA 20.

Next, an operation of the signal receiving circuit of a direct conversion system according to this embodiment will be described with reference to FIG. 1.

A radio signal inputted from the antenna (not shown) is inputted into the LNA input terminals 10. The LNA 20 amplifies the radio signal at low noise and low distortion characteristic and then outputs the amplified signal. It is advantageous for low noise characteristic in the system of the signal receiving circuit that the gain of the LNA 20 is set to be as high as possible within a range where distortion characteristic of the whole system of the signal receiving circuit is satisfied. An output signal from the LNA 20 is inputted into the filter 30. An output from the filter 30 is inputted into the semiconductor chip 1000 again.

In order to realize a radio signal processing circuit at a low cost, it is necessary to incorporate more function blocks configuring the radio signal processing circuit into one semiconductor chip. In general, a SAW filter, a dielectric filter, or the like is used as the filter 30. Though signal components present in bands other than a desired band are suppressed by the filter 30, the SAW filter or the dielectric filter cannot be incorporated into the semiconductor chip. Accordingly, the filter 30 is disposed outside the semiconductor chip 1000.

A clock signal generated from the clock signal oscillator 100 is inputted into the semiconductor chip 1000 and amplified in the clock signal buffers 110 and 120, and then supplied to the PLL 130 and the control circuit 170.

The circuit shown in FIG. 1 is different from the circuit shown in FIG. 4 in that a variable coupling line 180 is provided between the clock signal buffer 110 and the clock signal buffer 120. The variable coupling line 180 is inserted for equalizing the coupling of the clock signal and the input terminal of the LNA 20 and the coupling of the clock signal and the GND terminal. When the input terminal and the GND terminal of the LNA 20 are excited at the same phase, no output occurs at the output terminal of the LNA 20. That is, when the coupling degree is made variable so that higher harmonic waves of a clock excite the input terminal and the GND terminal of the LNA 20 at the same phase, an output signal from the LNA 20 regarding higher harmonic waves of a clock is cancelled.

Figure 2:
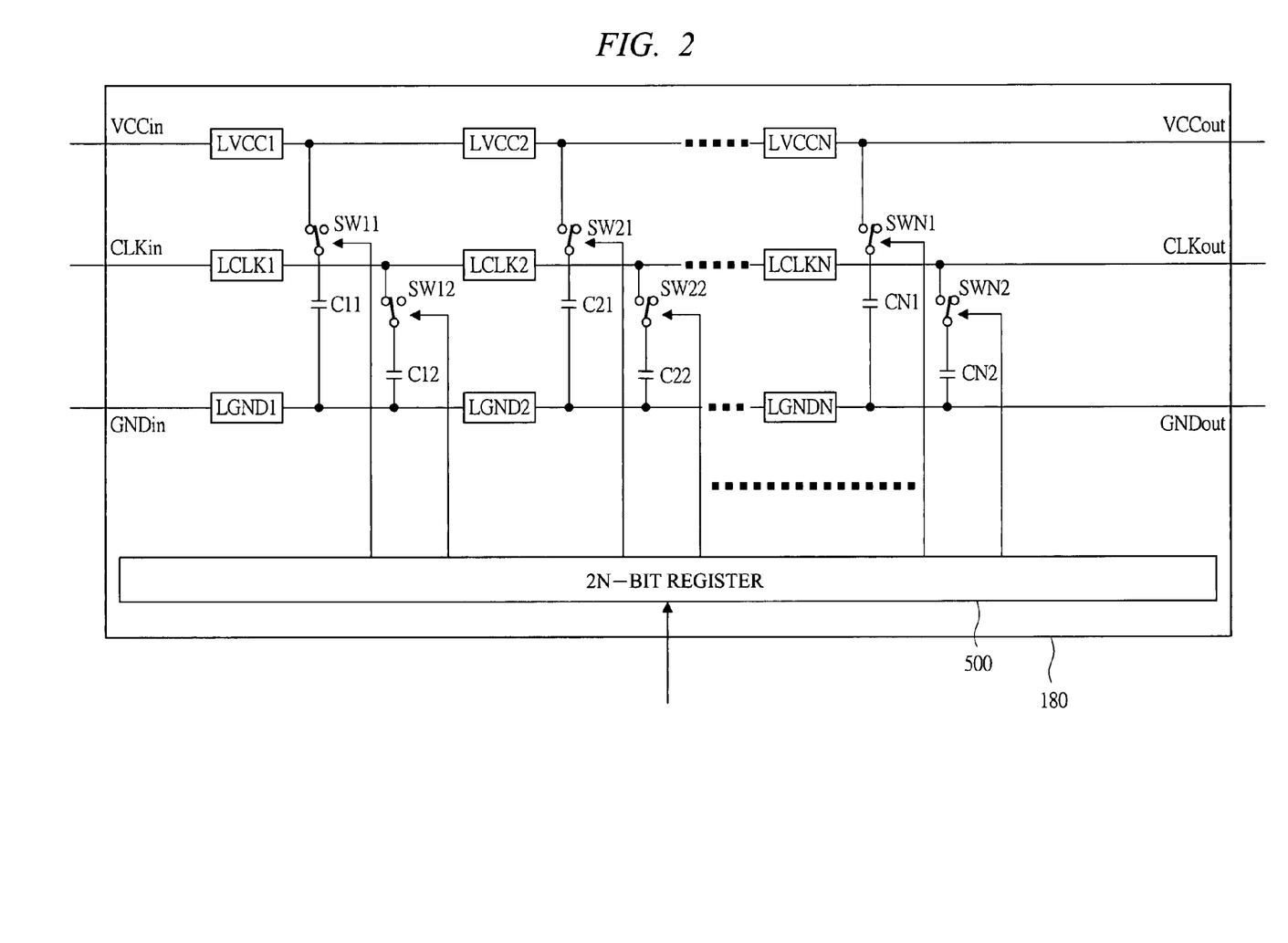
FIG. 2 is a diagram showing one example of a variable coupling line in the signal receiving circuit of a direct conversion system according to the embodiment to which the semiconductor integrated circuit for radio communication of the present invention has been applied.

One example of the variable coupling line 180 is shown in FIG. 2. In FIG. 2, C11, C12, C21, C22, . . . , CN1, and CN2 denote capacitors, SW11, SW12, SW21, SW22, . . . , SWN1, and SWN2 denote switches, LVCC1, LVCC2, . . . , and LVCCN denote transmission lines, LGND1, LGND2 . . . , and LGNDN denote transmission lines, LCLK1, LCLK2, . . . , and LCLKN denote transmission lines, and reference numeral 500 denotes a 2N-bit register.

The variable coupling line 180 includes three lines. There are a VCC line (VCCin to VCCout) that is a power source voltage line, a CLK line (CLKin to CLKout) that is a signal line through which a clock signal passes, and a GND line (GNDin to GNDout) that is a ground line.

A switch SWn1 and a capacitor Cn1 (n=1, 2, . . . , and N) connected in series are inserted in each of the lines between the VCC line and the GND line. A switch SWn2 and a capacitor Cn2 (n=1, 2, . . . , and N) connected in series are inserted in each of the lines between the CLK line and the GND line.

Incidentally, the switch and the capacitor are connected between the CLK line and the GND line in the example shown in FIG. 2, but they may be connected between the CLK line and the VCC line according to necessity such as situation of entrance of a clock signal. Adjacent sets of a switch and a capacitor may be disposed on the semiconductor chip at equal intervals or at a various intervals. However, since entrance situation cannot be grasped in advance in many cases, it is preferable in many cases that the adjacent sets are arranged at equal intervals. Also, it is important to separately dispose the sets of a switch and a capacitor on a route from the vicinity of the input terminal for a clock signal to the vicinity of the clock signal buffer 120 that is an inlet to a logic unit that is frequently disposed at a central portion of the semiconductor chip. Even if the sets are collectively disposed at a specific portion on the route, an expected effect cannot be achieved. Further, a method for configuring the capacitors C is not particularly limited, but MOS (metal oxide semiconductor) capacitors, MIM (metal-insulator-metal) capacitor, or the like may be used.

On the VCC line, transmission lines LVCCb are inserted between each switch SWa1 (a=1, 2, . . . , and N−1) and each switch SWb1 (b=a+1) in addition to the transmission line LVCC1. On the GND line, transmission lines LGNDb are inserted between each capacitor Ca1 (a=1, 2, . . . , and N−1) and each capacitor Cb1 (b=a+1) in addition to the transmission line LGND1. On the CLK line, transmission lines LCLKb are inserted between each switch SWa2 (a=1, 2, . . . , and N−1) and each switch SWb2 (b=a+1) in addition to the transmission line LCLK1.

N switches SWn1 positioned between the VCC line and the GND line and N switches SWn2 positioned between the CLK line and the GND line are arbitrarily turned ON and OFF by the 2N-bit register 500. When the switches SWn1 are turned ON, the VCC line is short-circuited to the capacitors Cn1, and when they are turned OFF, it is opened.

An inductance of a line is generally expressed by a function of a length of the line. Accordingly, the inductance of the line can be varied by turning ON or OFF the switches SWn1 and SWn2. When the inductance of the line is changed, a coupling degree from the line to the input terminal of the LNA 20 and a coupling degree from the line to the GND terminal of the LNA 20 are changed so that both the coupling degrees can be made equal to each other.

However, it is difficult to make a design taking into account the occurrence of higher harmonic waves in advance through simulation or the like due to a relative position relationship between the clock signal buffers 110 and 120 or their VCC, GND, and CLK lines and the LNA 20 on the chip. Accordingly, the semiconductor chip 1000 is mounted on a finished board and a register value in the 2N-bit register 500 is swept, and then an optimal register value is experimentally determined for each higher harmonic wave.

When a plurality of metals are present, they have mutual inductances among them. The problem posed here regarding the mutual inductance is the three lines in the variable coupling line 180, and the line for the input terminal of the LNA 20 and the line for the GND terminal of the LNA 20. Since capacitors are intentionally inserted between the VCC line and the GND line of the three lines in the variable coupling line 180 in any case, it is considered that the VCC line and the GND line are put in a substantially short-circuited state regarding high frequency signals such as higher harmonic waves of a clock signal. Therefore, they can be regarded as one member integrally made from the same metal.

Accordingly, in the variable coupling line 180, a mutual inductance between a pair of the VCC line and the GND line in the variable coupling line 180 and a line of the input terminal of the LNA 20, a mutual inductance between a pair of the VCC line and the GND line in the variable coupling line 180 and a line of the GND terminal of the LNA 20, a mutual inductance between the CLK line in the variable coupling lien 180 and the line of the input terminal of the LNA 20, and a mutual inductance between the CLK line in the variable coupling line 180 and the line of the GND terminal of the LNA 20 are changed by sweeping the register value of the 2N-bit register 500. By this means, an optimal register value is experimentally obtained for each higher harmonic wave so that the higher harmonic wave of a clock excites the input terminal and the GND terminal of the LNA 20 at the same phase, thereby suppressing the higher harmonic wave components in a clock signal within a predetermined band.

With reference to FIG. 1 again, the operation of the signal receiving circuit of a direct conversion system will be further described.

The control circuit 170 performs such a processing as gain switching in the LNA 20 and the variable gain amplifiers 51 and 52 and setting of the frequency dividing ratio of the PLL 130 according to a control signal inputted from the control signal input terminal 160.

The gain switching in the LNA 20 to a lower gain occurs when a signal level of a radio signal inputted from the antenna (not shown) into the LNA input terminal 10 is high enough to deteriorate the distortion characteristics in the system of the signal receiving circuit positioned at a downstream side of the filter 30. On the contrary, the gain switching in the LNA 20 to a higher gain occurs when a signal level of a radio signal inputted from the antenna (not shown) into the LNA input terminal 10 is not high enough to influence the distortion characteristics in the system of the signal receiving circuit positioned at a downstream side of the filter 30. In this manner, the noise characteristics and the distortion characteristics in the system of the receiving circuit become optimal.

The gain switching in the variable gain amplifiers 51 and 52 is performed so that levels of signals outputted from the output terminals 60 and 61 fall in a signal level range set by a demodulating circuit (not shown) disposed at downstream sides of the output terminals 60 and 61.

The PLL 130 compares a frequency of a signal obtained by dividing an oscillation frequency of the VCO 140 by a frequency dividing ratio set according to a control signal from the control circuit 170 and a frequency of a signal obtained by dividing a frequency of a clock signal from the clock signal buffer 120 by a frequency dividing ratio set according to a control signal from the control circuit 170 with each other and performs the control so that a difference therebetween becomes a desired level or less. By this means, an output voltage which determines the oscillation frequency of the VCO 140 is outputted to the VCO 140.

For example, when the clock signal frequency from the clock signal buffer 120 is represented as fR, the frequency dividing ratio set according to a control signal from the control circuit 170 for the clock signal frequency from the clock signal buffer 120 is represented as R, and the frequency dividing ratio set according to a control signal from the control circuit 170 for the oscillation frequency from the VCO 140 is represented as N, an oscillation frequency fVCO of the VCO 140 is expressed by the following equation.

$$fVCO = fR \times N/R$$

By this means, the VCO 140 is controlled to oscillate at different frequencies according to respective receiving channels. Since the signal receiving circuit shown in FIG. 1 is of the direct conversion system like that shown in FIG. 4, the center frequency of a receiving channel and a frequency of an oscillation signal provided to the mixers 41 and 42 are controlled to be equal to each other.

The oscillation signals from the VCO 140 are inputted to the mixer 41 and the mixer 42. In this case, the oscillation signal inputted into the mixer 41 has the same phase as the original oscillation signal and the oscillation signal inputted into the mixer 42 is converted by the 90-degree phase shift circuit 150 so as to have a phase different from that of the signal inputted into the mixer 41 by 90 degrees. An output signal from the mixer 41 is amplified to a desired level by the variable gain amplifier 51, and after signal components of the amplified output signal in bands other than a desired channel band are suppressed by the filter 53, the signal is outputted from the output terminal 60. An output signal from the mixer 42 is amplified to a desired level by the variable gain amplifier 52, and after signal components in the amplified output signal in bands other than a desired channel band are suppressed by the filter 54, the signal is outputted from the output terminal 61.

The mixers 41 and 42 are collectively called "orthogonal mixer" and they are shown as an orthogonal mixer 40 in FIG. 1. The variable gain amplifiers 51 and 52 and the filters 53 and 54 perform processing of a low frequency signal in a desired channel band obtained by the frequency conversion by the orthogonal mixer 40 and they are shown as a low frequency signal processing unit 50 in FIG. 1.

The power source VCC is a power source which supplies power to the semiconductor chip 1000. The power is inputted into the semiconductor chip 1000 via the transmission lines LE1 to LE4. The capacitor CE2 is inserted between the LNA 20 and the power source and the capacitor CE1 is inserted between the clock signal buffers 110 and 120 and the power source, so that characteristic degradation and malfunction due to noise or the like can be suppressed by short-circuiting the impedance of the power source VCC which rises due to the influence of the transmission lines LE1 to LE4 in an AC manner.

Figure 3:
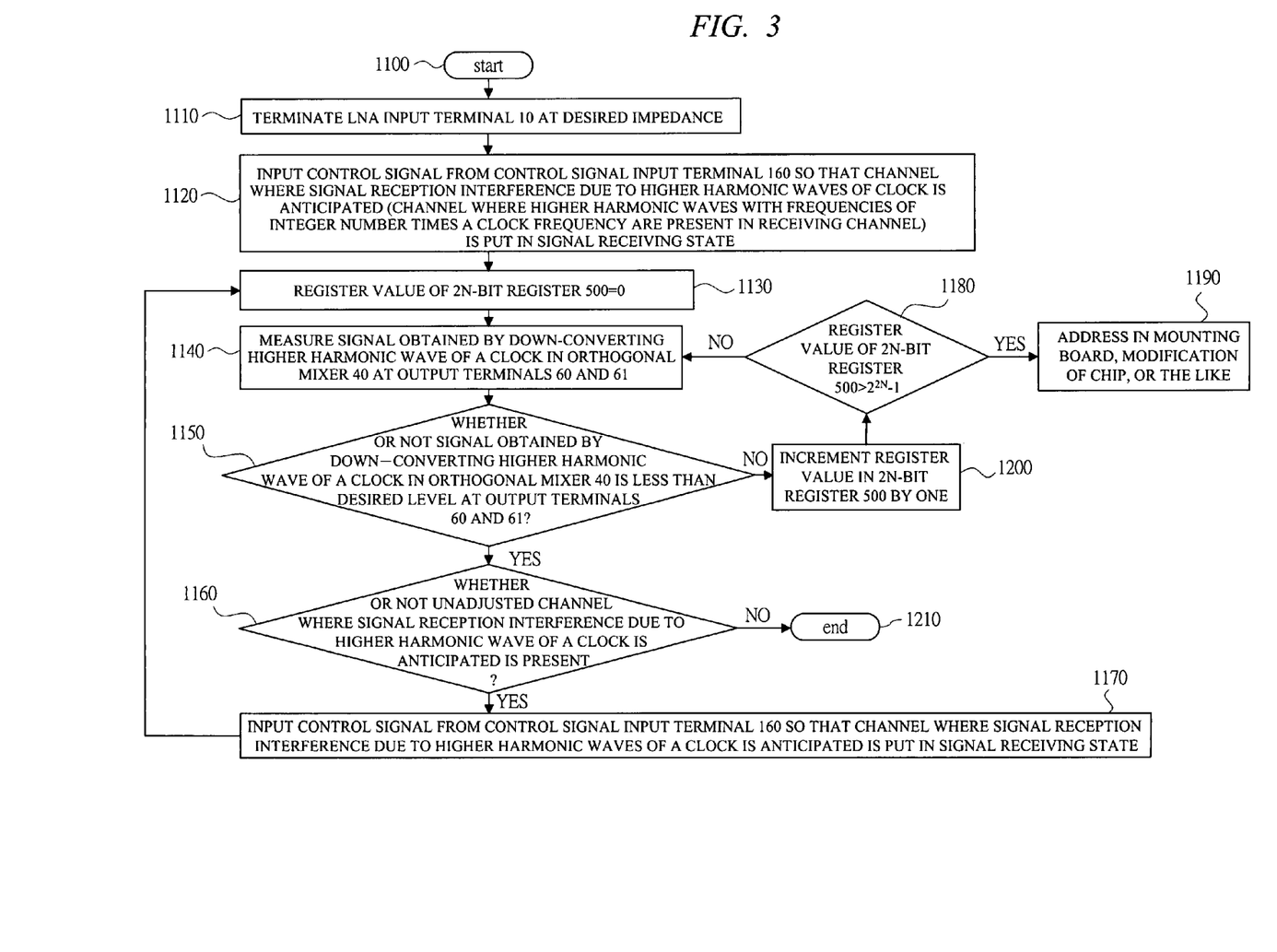
FIG. 3 is a flowchart showing a procedure for adjusting signal reception interference due to higher harmonic waves of a clock in the signal receiving circuit of a direct conversion system according to the embodiment to which the semiconductor integrated circuit for radio communication of the present invention has been applied.

FIG. 3 is a flowchart showing a procedure for adjusting signal reception interference due to higher harmonic waves in a clock signal in the signal receiving circuit of a direct conversion system according to this embodiment.

First, when adjustment for signal reception interference due to higher harmonic waves of a clock starts (step 1100), the LNA input terminal 10 terminates at a predetermined impedance at step 1110, and a control signal is inputted from the control signal input terminal 160 so that a channel where signal reception interference due to higher harmonic waves of a clock is anticipated (channel where higher harmonic waves with frequencies of integer number times a clock frequency are present in a receiving channel) is put in a signal receiving state at step 1120.

Next, a register value in the 2N-bit register 500 is set to 0 at step 1130. Then, as shown in FIG. 1140, a signal obtained by down-converting a higher harmonic wave of a clock in the orthogonal mixer 40 is measured by the output terminals 60 and 61 in the signal receiving circuit of a direct conversion system shown in FIG. 1. Determination about the measurement result is made at step 1150. When the signal is less than a desired level (YES), since there is no problem in the signal, the control proceeds to the adjustment for another unmeasured and unadjusted channel where signal reception interference due to a higher harmonic wave of a clock is anticipated (steps 1160 and 1170). Meanwhile, when the signal is equal to or more than the desired level (NO), the register value in the 2N-bit register 500 is incremented by 1 (step 1200).

After the register value in the 2N-bit register 500 is incremented, it is determined whether or not the value in the 2N-bit register 500 exceeds ($2^{2N}-1$) at step 1180. When the value does not exceed ($2^{2N}-1$) (NO), level measurement of the output terminals 60 and 61 is repeated (step 1140).

When the value in the 2N-bit register 500 exceeds ($2^{2N}-1$) at step 1180 (YES), the channel cannot be addressed by the variable coupling line 180 incorporated in the semiconductor chip 1000. Therefore, the channel is addressed by a mounting board of the semiconductor chip 1000 or the semiconductor chip 1000 must be modified (step 1190).

Then, a control signal is inputted from the control signal input terminal 160 so that a channel where signal reception interference due to higher harmonic waves of a clock is anticipated is put in a signal receiving state at step 1170. When adjustment of all unadjusted channels where signal reception interference due to a higher harmonic wave of a clock is anticipated is finished at step 1160 (NO) and an optimal value of the 2N-bit register 500 to each channel is determined, the procedure for addressing the signal reception interference due to a higher harmonic wave of a clock is terminated in the signal receiving circuit of a direct conversion system shown in FIG. 1 (step 1210).

According to the embodiment described above, the variable coupling line 180 is provided between the clock signal buffer 110 and the clock signal buffer 120 so that coupling of the variable coupling line 180 and the input terminal of the LNA 20 and coupling of the variable coupling line 180 and the GND terminal of the LNA 20 at frequencies of higher harmonic waves of a clock signal are made equal to each other. By this means, even if a circuit block requiring a clock signal such as the PLL 130 and a circuit block requiring low-noise receiving characteristics such as the LNA 20 are disposed in one semiconductor chip 1000, desired signal receiving characteristics can be secured.

In the foregoing, the invention made by the inventors of the present invention has been concretely described based on the embodiments. However, it is needless to say that the present invention is not limited to the foregoing embodiments and various modifications and alterations can be made within the scope of the present invention.

In the embodiment above, for example, the case where the present invention has been applied to the signal receiving circuit of a direct conversion system has been described. However, since the present invention is intended to solve the problem of the influence of a clock signal on the LNA, it can be applied to another signal receiving system regardless of the signal receiving circuit of a direct conversion system or others.

The present invention can be applied to not only the semiconductor integrated circuit for radio communication but also other semiconductor integrated circuits. In such a case, a coupling degree between any semiconductor integrated circuits can be made variable.

When the present invention is applied to semiconductor integrated circuits for radio communication, in particular, to a cellular phone adopting a WCDMA (Wideband Code Division Multiple Access) system, since signal transmission and signal reception are simultaneously performed, it is necessary to provide filters between the LNA and the orthogonal mixer as described above. Accordingly, since the number of terminals in a semiconductor chip increases when differential input and differential output are adopted in the LNA, a single configuration is more desired than the differential configuration. In this case, since influence of a clock signal on the LNA becomes larger than that in the differential configuration, the present invention is especially effective.

The present invention relates to a technology for a semiconductor integrated circuit. More particularly, it is effectively applied to a semiconductor integrated circuit for radio communication in which a circuit block requiring a clock signal and a circuit block requiring low-noise receiving characteristics are disposed in one chip.

What is claimed is:

1. A semiconductor integrated circuit comprising:
   a first circuit where N sets of a switch and a capacitor connected in series are inserted in parallel between a power source voltage line and a ground line;
   a second circuit where N sets of a switch and a capacitor connected in series are inserted in parallel between a signal line and the ground line or the power source voltage line; and
   a 2N-bit register which arbitrarily turns ON or OFF said N switches in the first circuit and said N switches in the second circuit.

2. A semiconductor integrated circuit for radio communication comprising:
   an LNA which amplifies a signal from an input terminal to output the same;
   a VCO which changes an oscillation frequency according a voltage value of an input voltage;
   a control circuit which feeds a control signal from a control signal input terminal to said VCO and said LNA;
   a PLL which receives the control signal from said control circuit and compares an output from a clock signal oscillator and an oscillation frequency of said VCO with each other to perform control so that the oscillation frequency of the VCO becomes a function of the control signal and a clock signal frequency;
   a 90-degree phase shift circuit which shifts a phase of an oscillation signal of said VCO by 90 degrees; and
   a mixer circuit which multiplies an output signal from said 90-degree phase shift circuit or the oscillation signal of said VCO and an output signal from a filter by each other to output a sum frequency component of an output signal frequency of said 90-degree phase shift circuit or an oscillation signal frequency of said VCO and an output signal frequency of said filter or a difference frequency component therebetween,
   wherein a variable coupling line which can change a coupling degree of an input terminal of said LNA to a ground terminal of said LNA is provided at an input stage of said PLL.

3. The semiconductor integrated circuit for radio communication according to claim 2,
   wherein said variable coupling line comprises:
   a first circuit where N sets of a switch and a capacitor connected in series are inserted in parallel between a power source voltage line and a ground line;
   a second circuit where N sets of a switch and a capacitor connected in series are inserted in parallel between a signal line and the ground line or the power source voltage line; and
   a 2N-bit register which arbitrarily turns ON or OFF said N switches in the first circuit and said N switches in the second circuit.

4. A semiconductor integrated circuit for radio communication comprising:
   an LNA which amplifies a signal from an input terminal at low noise and low distortion characteristic and with a desired gain and outputs the amplified signal;
   a VCO which changes an oscillation frequency according a voltage value of an input voltage;
   a first variable gain amplifier which amplifies an input signal with a desired gain and outputs the same;
   a second variable gain amplifier which is equal to said first variable gain amplifier;
   a control signal input terminal to which a first control signal for setting an oscillation frequency of said VCO, a second control signal for setting a gain value of said LNA, and a third control signal for setting gain values of said first and second variable gain amplifiers are inputted;
   a control circuit which feeds the first, second, and third control signals from said control signal input terminal to said VCO, said LNA, and said first and second variable gain amplifiers, respectively;
   a first clock signal buffer which amplifies an output from a clock signal oscillator;
   a second clock signal buffer which amplifies an output from said first clock signal buffer;
   a PLL which receives a first control signal from said control circuit and compares an output from said second clock signal buffer and an oscillation frequency of said VCO with each other to perform control so that the oscillation frequency of the VCO becomes a function of the first control signal and a clock signal frequency;
   a first mixer which multiplies an oscillation signal of said VCO and an output signal from the filter by each other and outputs a sum frequency component of an oscillation signal frequency of said VCO and an output signal frequency of said filter or a difference frequency component therebetween;
   a 90-degree phase shift circuit which shifts a phase of an oscillation signal of said VCO by 90 degrees;
   a second mixer which multiplies an output signal from said 90-degree phase shift circuit and an output signal from said filter by each other and outputs a sum frequency component of an output signal frequency of said 90-degree phase shift circuit and an output signal frequency of said filter or a difference frequency component therebetween;
   a first filter which suppresses a signal component present in bands other than a desired band from a signal obtained by amplifying an output from said first mixer to a desired gain in said first variable gain amplifier and then outputted from said first variable gain amplifier; and a second filter which suppresses a signal component present in bands other than a desired band from a signal obtained by amplifying an output from said second mixer to a desired gain in said second variable gain amplifier and then outputted from said second variable gain amplifier, wherein a variable coupling line which can change a coupling degree of an input terminal of said LNA to a ground terminal of said LNA is provided between said first clock signal buffer and said second clock signal buffer.

5. The semiconductor integrated circuit for radio communication according to claim 4, wherein said variable coupling line comprises:

a first circuit where N sets of a switch and a capacitor connected in series are inserted in parallel between a power source voltage line and a ground line;

a second circuit where N sets of a switch and a capacitor connected in series are inserted in parallel between a signal line and the ground line or the power source voltage line; and a 2N-bit register which arbitrarily turns ON or OFF said N switches in the first circuit and said N switches in the second circuit.

* * * * *